United States Patent [19] [11] 3,760,958
Lohneis [45] Sept. 25, 1973

[54] CLAMPING TOOL CHANGER MECHANISM AND ACTUATING MECHANISM FOR A MACHINE TOOL

[75] Inventor: Earl R. Lohneis, Milwaukee, Wis.

[73] Assignee: Kearney & Trecker Corporation, West Allis, Wis.

[22] Filed: May 22, 1972

[21] Appl. No.: 255,410

[52] U.S. Cl. ............................... 214/1 BD, 29/568
[51] Int. Cl. .............................................. B23q 5/32
[58] Field of Search ...................... 214/1 BD, 147 T; 29/568

[56] References Cited
UNITED STATES PATENTS
3,587,873   6/1971   Lohneis ........................... 214/1 BD
FOREIGN PATENTS OR APPLICATIONS
4,743,273   11/1972   Japan ............................. 214/1 BD Primary Examiner—Gerald M. Forlenza
Assistant Examiner—George F. Abraham
Attorney—Cyril M. Hajewski et al.

[57] ABSTRACT

The present invention relates to a tool changer mechanism operative to effect a bodily interchange of a pair of toolholders respectively mounted in spaced apart parallelism in an operating station and a storage station. To effect a tool interchange, a pair of independent and oppositely rotatable toolholder arms, are normally positioned in a vertical or substantially parallel parked position about a common parallel axis, between the horizontally spaced apart operating and storage stations respectively. Each of the toolholder arms is provided towards its opposite ends with inwardly or oppositely disposed semicircular openings movable toward one another into opposed or clamped tool encompassing relationship. The arms are interconnected to be controlled by a novel reversing mechanism to effect clockwise rotation of one arm simultaneously with effecting counterclockwise rotation of the other arm. By means of this arrangement, the inner and outer arms are initially rotated 90° in opposite directions to move the semicircular openings toward one another into a fully enclosed clamped position about the spaced apart toolholders carried in spaced apart parallelism in the operating station and storage station respectively. After urging the separate arms into fully enclosed gripping engagement with the spaced apart tools, a transverse cylinder is actuated to simultaneously move both oppositely clamped arms rectilinearly outward to extract the fully enclosed or clamped tools from the respective sockets. Next, with both arms still locked in enclosed tool engaging position, the entire assembly is rotated 180° to bodily interchange the positions of the enclosed tools relative to the spaced apart storage and operating stations. The assembly is then reversibly moved rectilineally inward to reinsert the now interchanged tools after which the reverse mechanism is again operated to reactuate the arms in independent reversed direction to return parked position.

16 Claims, 16 Drawing Figures

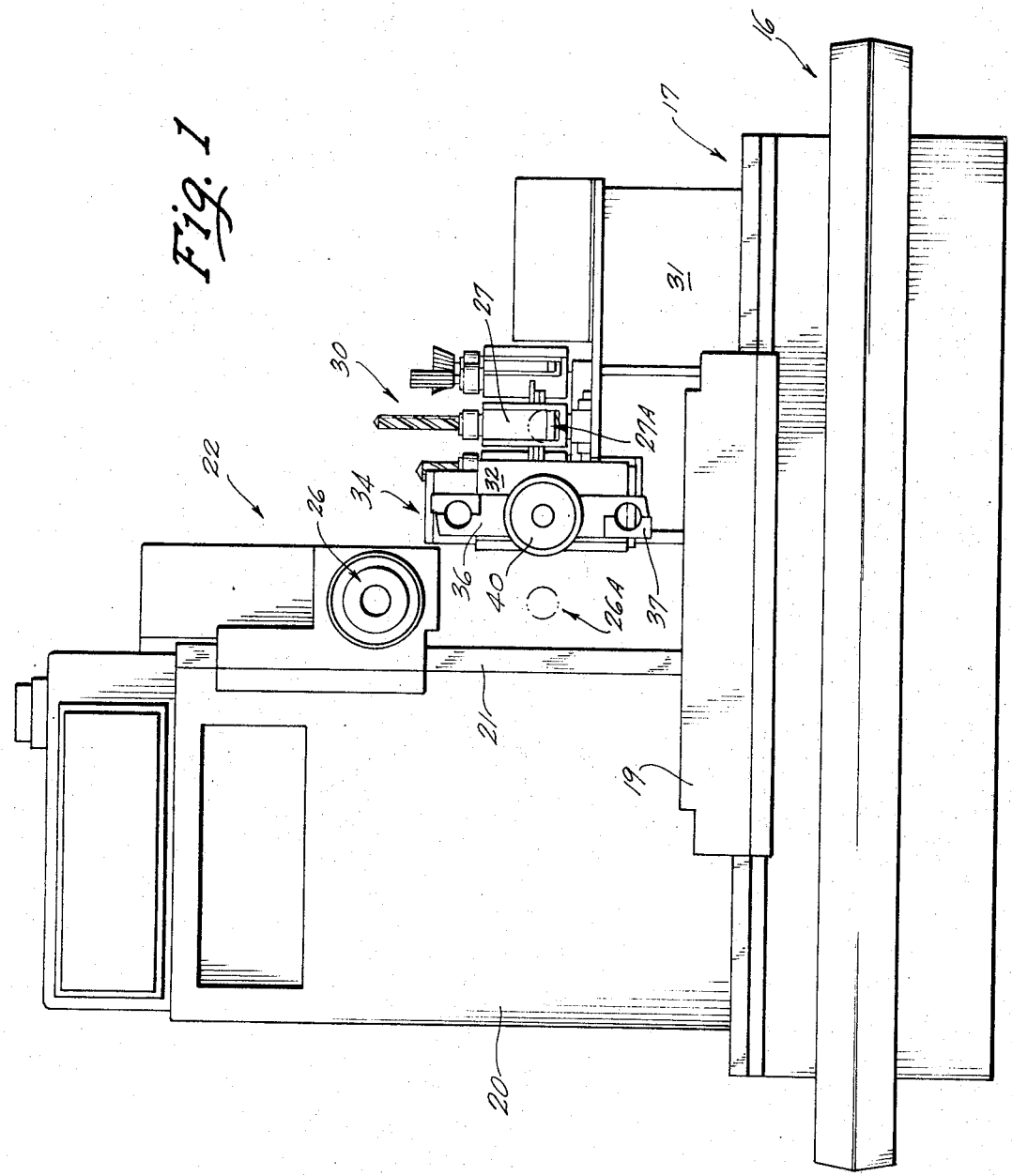

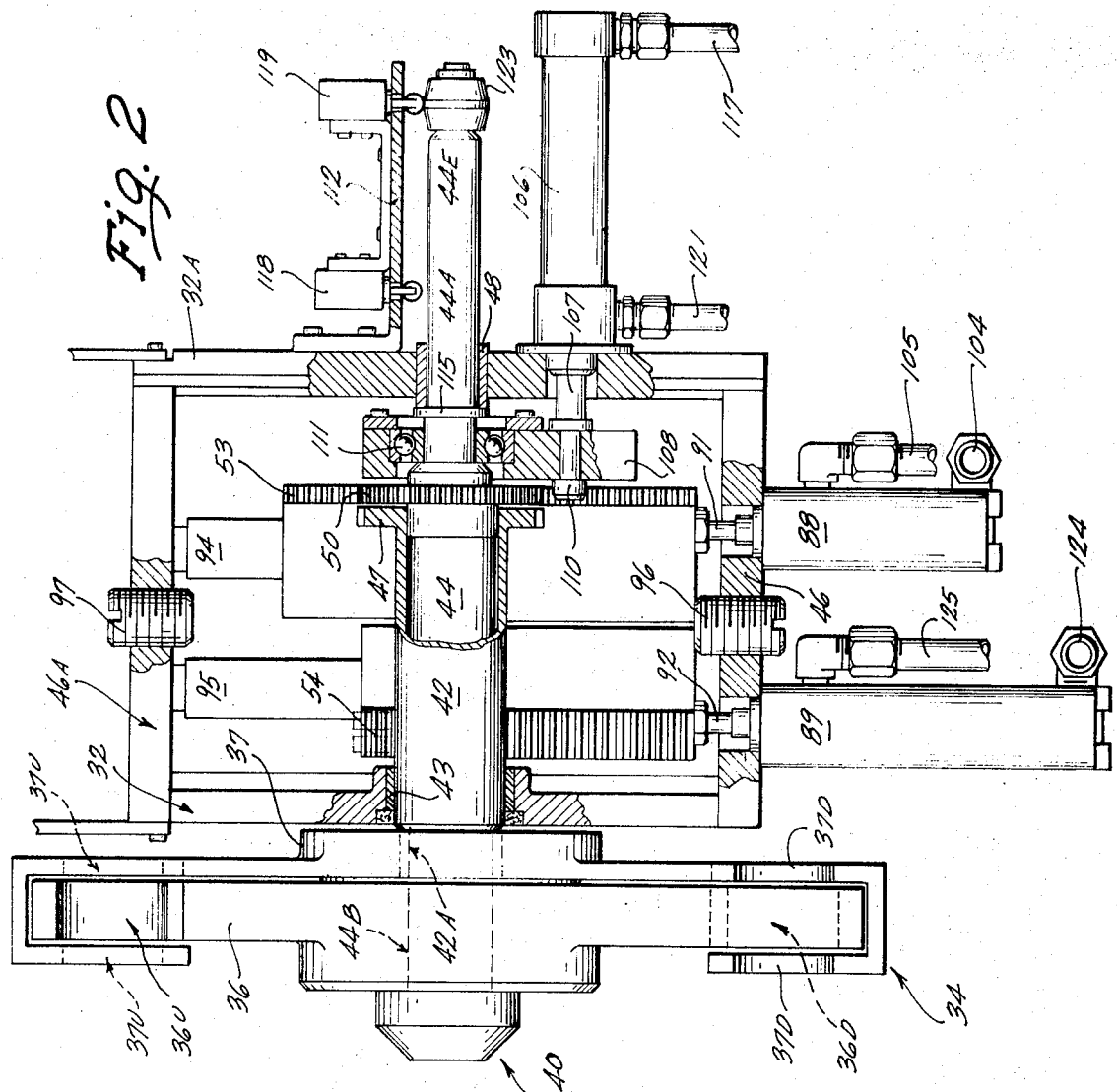
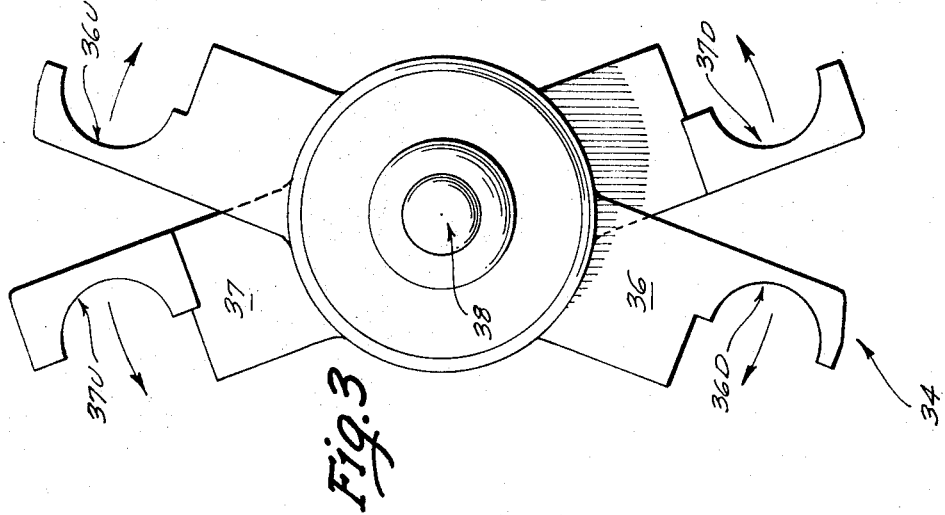

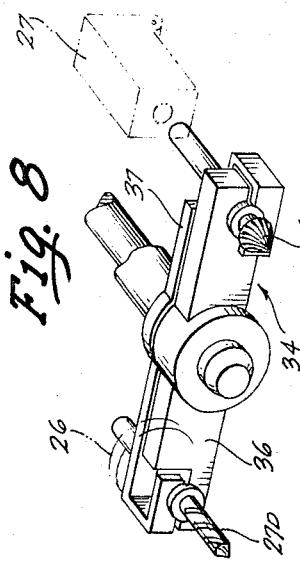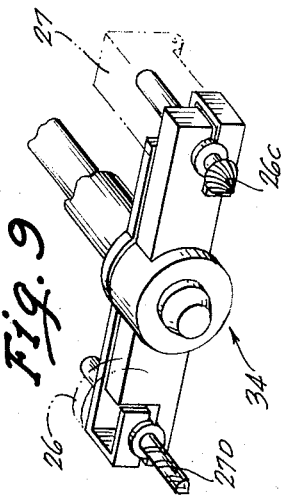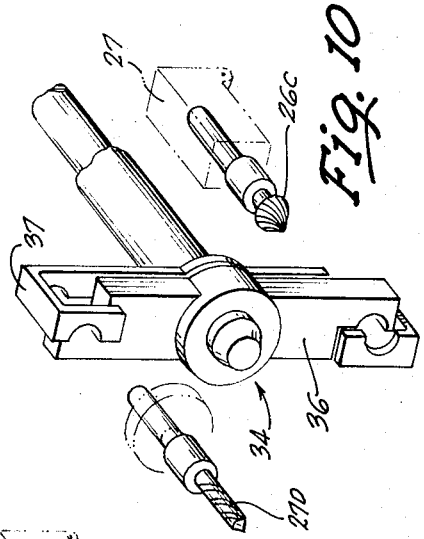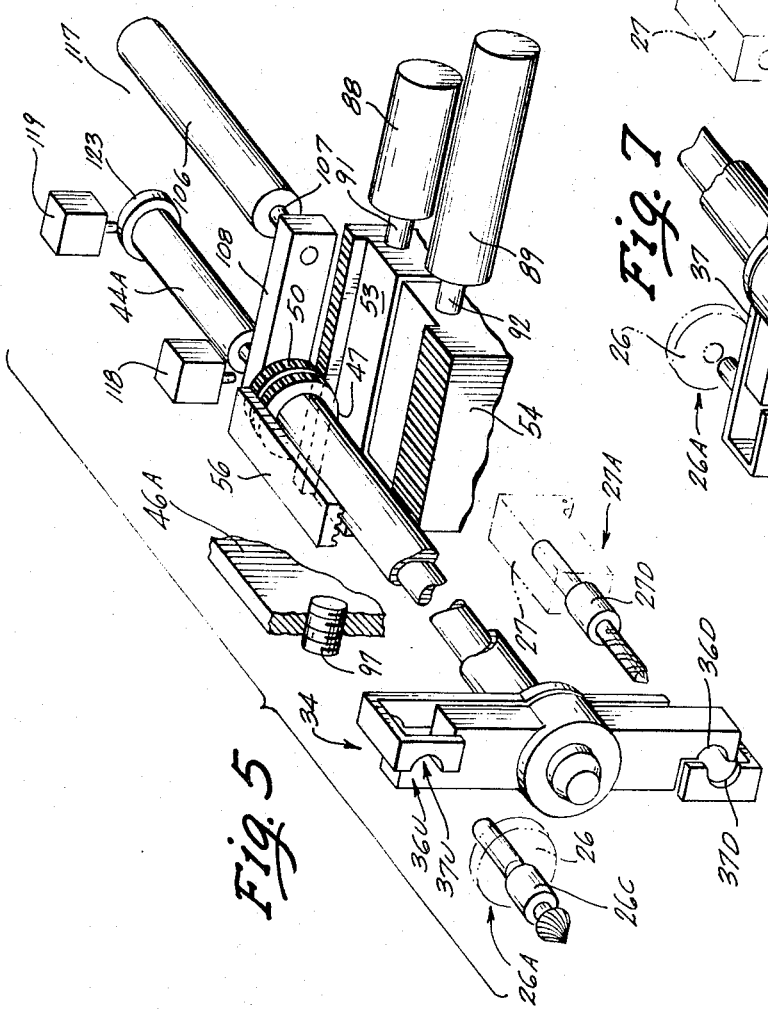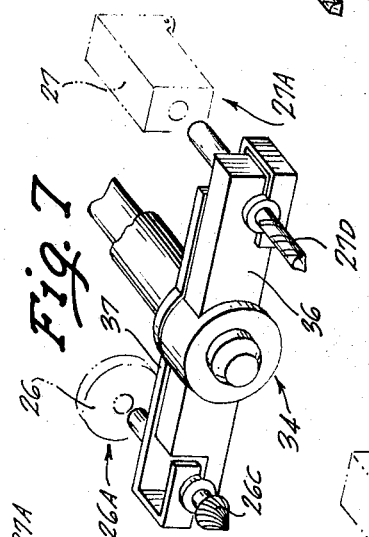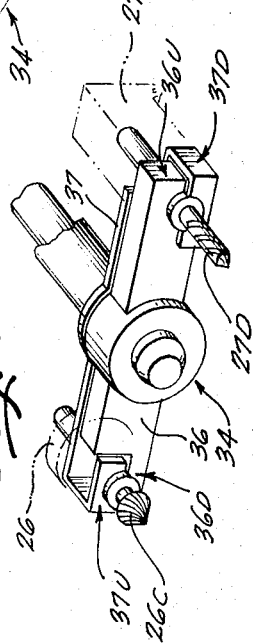

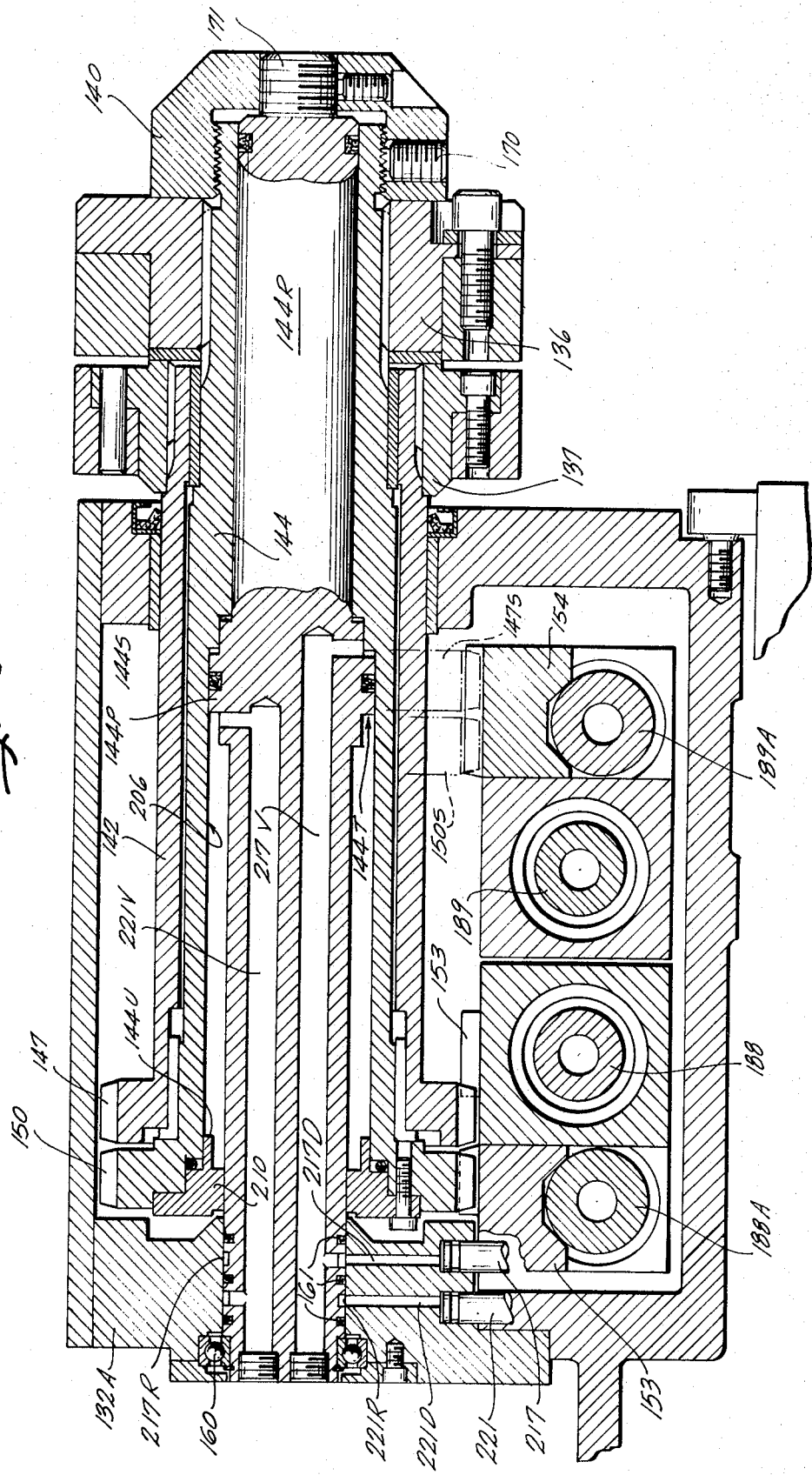

CLAMPING TOOL CHANGER MECHANISM AND ACTUATING MECHANISM FOR A MACHINE TOOL

BACKGROUND OF THE INVENTION

Prior types of tool changer devices usually comprised a single rotatable tool change arm having oppositely disposed semicircular tool receiving openings at its opposite ends. For positively gripping tools during an interchange, independently operable tool clamps or grips were respectively associated with each of the oppositely disposed semicircular tool receiving openings. These arrangements necessitated complex independent actuating devices for operating each of the independent tool grips. The sequencing arrangement required rotation of the independent single arm from a parked position into a position in which each of the semicircular openings was moved into tool gripping arrangements. After this, the complex independent actuating mechanisms were then operated to move the independent grips into engagement with the respective tools to permit the subsequent interchanging movement of the single arm. After the arm had been moved to effect a bodily tool interchange, the independent actuating mechanisms were reactuated to unclamp the independent grips permitting the subsequent return movement of the independent single arm to parked position.

SUMMARY OF THE INVENTION

According to this invention, there is provided an improved tool change mechanism for a machine tool that incorporates a greatly improved tool engaging arm comprising separate and independently rotatable inner and outer arms journalled to rotate about a common axis. Towards its opposite ends, each of the independent arms is provided with a pair of inwardly opposed semicircular openings. From a substantially vertical parked position between a pair of spaced apart horizontally disposed toolholders, the arms are reversibly rotated toward one another and into tool enclosing engagement. To accomplish this, the arms are interconnected by a reverse mechanism initially operable to simultaneously rotate both arms from substantial vertical parked position for moving the semicircular openings at the end of each arm into opposed tool enclosing engagement with the periphery of the respective tools. As movement is effected from parked to engaged position, means are provided to lock the opposed independently rotatable tool arms into tool enclosing clamped engagement with the spaced apart toolholders carried in the operating and storage stations. After tool enclosing engagement, the two arms and now clamped tools are moved as a single housing or enclosure to effect a bodily tool interchange between spaced apart sockets or stations.

A principal advantage of the present invention is the fact that the initial power driven movement of the separate tool arms from parked position simultaneously coacts in a manner to effect both tool engagement and positive tool enclosed clamping. The independently rotatable tool engaging arms are individually carried by rearwardly extending, concentrically journalled horizontal shafts independently powered by separate power input gears. With the substantially vertically disposed arms inwardly retracted for initial tool engagement, a single input gear engaging the reverse transmission is retracted inwardly to engage a transversely and lineally movable 90° rack.

Initial inward movement of a transverse cylinder operates the 90° rack lineally to rotate the reverse input gear connected to effect opposite rotation of the inner and outer arms into tool enclosing clamped engagement. After the two arms are rotated into opposed horizontal clamped engagement with the horizontally spaced apart toolholders, the concentrically disposed drive shafts are urged horizontally forward to an extended position thereby extracting both of the now clamped toolholders outwardly from the sockets. As this occurs, both input gears respectively associated with the concentric input shafts are moved axially forward into simultaneous meshing engagement with a forwardly spaced transversely disposed 180° rack. The forwardly spaced 180° rack is then actuated to the full extent of its transverse lineal movement to effect a like 180° rotation of the still clamped tool arms relative to the sockets. Reinsertion of the now interchanged tools is then effected by retracting the still clamped tool arms and tools inwardly. Simultaneously the concentrically disposed drive shafts are retracted to disengage both power input gears from the forward 180° rack and reengage only the one power reverse input gear with the rearwardly spaced 90° rack which is lineally actuated in reverse direction to effect a 90° reverse rotation of the inner and outer arms from horizontal clamped position to a disengaged vertically parked position.

It is a general object of the present invention to provide a greatly improved tool change mechanism for a machine tool.

Another object of the invention is to provide an improved tool change mechanism that is operably driven into engaged position and simultaneous clamped position with tools about to be transferred.

Another object of the invention is to provide an improved tool changing mechanism comprising two arms that are journalled to rotate about a common axis and driven from a parked position into opposed clamped engagement with a pair of spaced toolholders that are bodily interchanged by simultaneous bodily movement of the clamped toolholders which are then clamped in tool enclosing engagement.

A still further object of the invention is to provide a concentrically journalled inner and outer tool change arm reversibly driven by a single transmission into opposed tool enclosing engagement with toolholders which are then bodily interchanged by subsequent movement of the now clamped tool change arms as a single enclosure.

Another object of the invention is to provide a pair of concentrically journalled tool change arms that are reversibly driven by one transmission into enclosed clamped engagement with a pair of spaced apart toolholders, and shiftably moved in clamped engagement with the toolholders to a spaced apart position to be simultaneously driven as one tool change enclosure by a spaced apart transmission.

BRIEF DESCRIPTION OF THE DRAWINGS

FIG. 1 is a view in front elevation of a machine tool incorporating the features of the present invention;

FIG. 2 is a view partly in right side elevation and partly in section of the tool change mechanism, and with the axially spaced apart racks in vertical parallel positions;

FIG. 3 is a detailed view of the changer mechanism showing the reversibly rotatable tool engaging arms partially separated;

FIGS. 5 to 10 inclusive are a series of fragmentary views in perspective of the improved tool changer effecting a tool interchange and with the 90° and 180° lineal input racks positioned horizontally;

FIG. 14 is an enlarged detailed view in horizontal section through the improved modified embodiment of the tool changer shown in FIGS. 11 and 12; and, FIGS. 13, 15 and 16 illustrate novel switch controls responsive to machine movements for sequentially actuating the invention.

DESCRIPTION OF THE PREFERRED EMBODIMENTS

Figure 4:
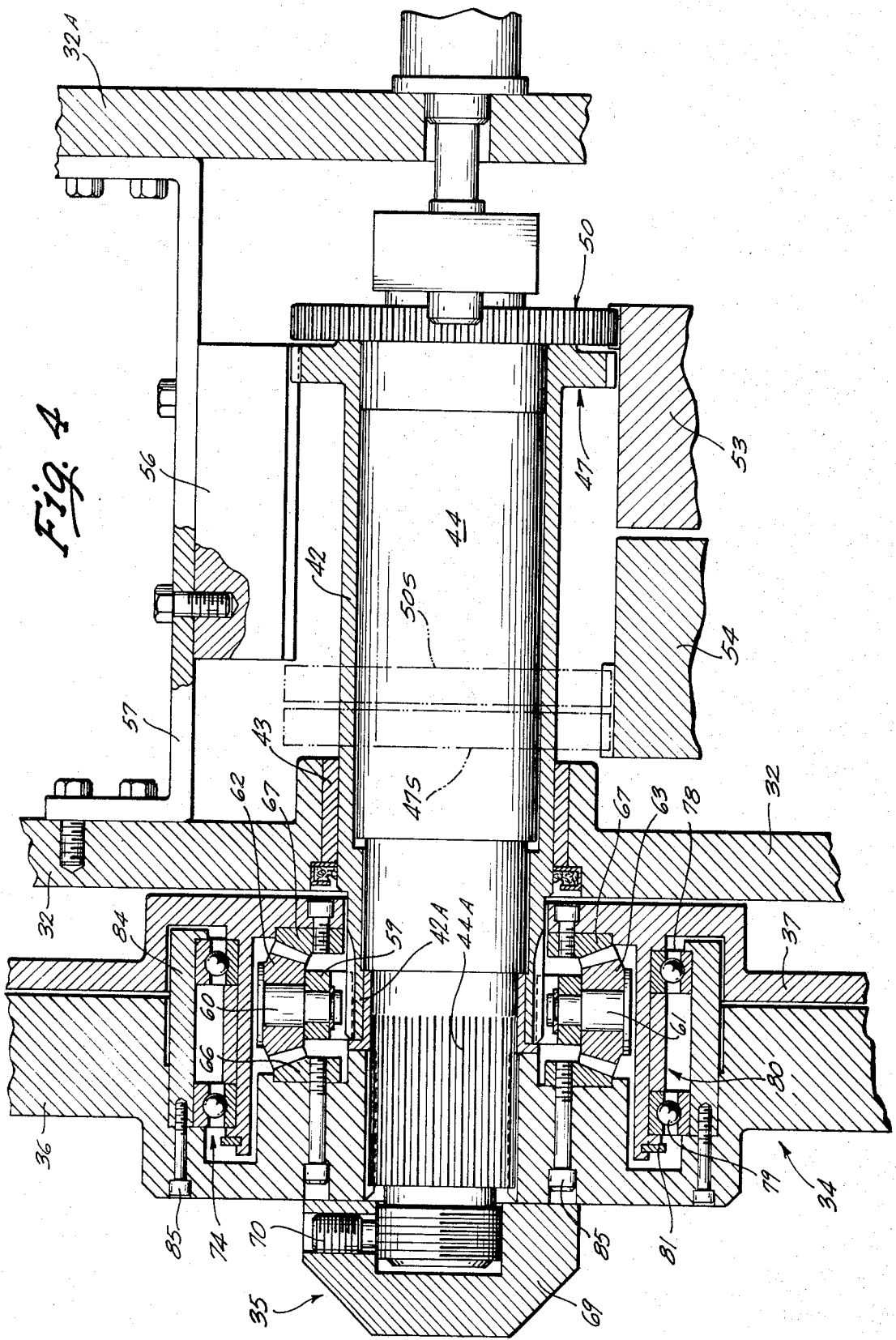
FIG. 4 is an enlarged detailed view partly in elevation and partly in horizontal section through the improved tool change mechanism.
Figure 13:
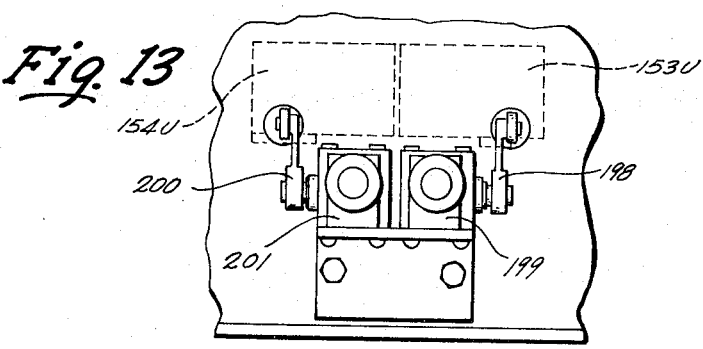

Referring now to the drawings and specifically to FIG. 1 thereof, a machine tool incorporating the features of the present invention is there shown in front elevation. The machine comprises generally an enlarged rectangular base or frame 16 presenting on its upper surface a pair of spaced apart longitudinally extending ways such as 17, disposed to slidably engage complimentary ways (not shown) presented by the underside of a work table 19 in well-known manner. A vertical column 20 is provided on its underside with rearwardly extending horizontal ways (not shown) disposed to slidably engage complimentary rearwardly extending horizontal ways (not shown) provided on the rearwardly extending portion of the supporting base 16. A rearwardly extending horizontal translating mechanism is operative to effect rearward horizontal movement of the entire vertical column relative to both the base 16 and to the longitudinally slidable work table 19 carried thereby. In similar manner, a longitudinally extending translating mechanism (not shown) is operably connected to effect selective longitudinal movement of the work table 19 along the supporting longitudinal ways 17 presented by the base 16.

Along its rightward edge, the vertically upstanding column 20 is provided with a pair of rearwardly spaced apart parallel supporting ways such as 21 that slidably engage complementary ways (not shown) presented along the inner edge of a vertically movable spindle head 22.

Work table 19, vertical column 20, and spindle head 22 are respectively mounted for longitudinal movement along mutually transverse axes. Likewise, the usual power driven translating mechanisms are connected to effect movement of work table 19, column 20, and spindle head 22 along the respectively designated X, Z, and Y axes in well-known manner such as fully described in U.S. Pat. No. 3,587,873. In addition to effecting selective longitudinal movement along three mutually transverse axes as described, the spindle head 22 is movable along the transverse Z and Y axes for positioning the tool spindle 26 in a tool changing position indicated at 26A in FIG. 1. As will hereinafter be more fully explained in FIG. 5, the position 26A is considered a tool receiving operating station and is positioned in a horizontally spaced apart position to a tool receiving storage position indicated at 27A in FIG. 5. Referring again to FIG. 1, the tool receiving storage station indicated by the phantom line position 27A illustrates the toolholder 27 tilted forwardly in the tool interchange position. In its present, upwardly tilted position illustrated at 27 in FIG. 1, it will be understood the toolholder 27 is carried by the horizontally movable tool storage magazine 30. The storage magazine 30 comprises a plurality of upwardly tilted tool receiving holders carried for selective horizontal indexing movement relative to the present upwardly tilted toolholder 27.

As fully illustrated and described in the aforementioned U.S. Pat. No. 3,587,873, each of the toolholders such as 27 is maintained in upwardly tilted vertical positions during horizontal tool selecting indexing movement of the storage magazine 30. Upon arrival of the selected tool in tool changing position, the vertically disposed toolholder 27 is tilted forwardly to a horizontal position indicated at 27A in spaced apart parallelism relative to a horizontally positioned tool operating position indicated at 26A.

Selective indexable movement of the respective chain links comprising the tool magazine 30 is accomplished in a manner similar to that fully illustrated and described in the aforementioned U.S. Pat. No. 3,587,873. As soon as preselected tools are positioned in horizontally spaced apart parallelism in the operating station 26A and storage station 27A, a tool interchange can be effected by operating a tool changer 34 intermediately positioned therebetween as will be more fully illustrated and explained in FIG. 5.

It will be readily apparent that the tool storage magazine 30 and tool changer 34 can be combined as one independent separate unit mounted adjacent the machine, as shown in FIG. 1, or combined with the machine frame 16 to provide one unitary structure. In either case, the tool change mechanism 34 operates in a like improved manner to effect a bodily interchange of toolholders positioned in the horizontally spaced apart operating station 26A and storage station 27A respectively as will be explained.

To this end, the unitary tool change mechanism 34 actually comprises two tool engaging arms or elements 36 and 37 respectively journalled to rotate about the same concentric axis 40. The entire tool storage magazine 30 and tool changer 34 are carried by a support frame 31 that can be mounted independently of the machine frame 16 as shown in FIG. 1. In addition to supporting the storage magazine 30, the support frame 31 likewise supports as associated transmission housing 32 arranged to enclose the tool change mechanism 34 and support the tool change arms 36 and 37 for rotation about the central axis 38. From the parked position about horizontal axis 40, the arms 36 and 37 comprising the tool change mechanism 34, are simultaneously rotated 90° in opposite directions in a manner that the opposed semicircular openings are reconnected in enclosed clamped engagement about toolholders positioned in the respectively spaced apart stations 26A and 27A. After being rotated 90° in reverse directions by one transmission and reclamped in horizontal tool clamped position, the arms 36 and 37 are shifted axially forward as one unitary structure to be engaged by a second transmission connected to effect a bodily tool interchange between the respectively spaced apart stations 26A and 27A.

The separate power input transmissions for reversibly driving the tool change arms 36 and 37 in opposite directions to engage the tools as a tool engaging clamp, and for then driving both clamped arms in the same direction as one unitary tool changing structure 34 are shown more clearly in FIGS. 2 and 4 and essentially comprise axially spaced apart parallel racks 53 and 54. As shown in FIGS. 2 and 3, the inner arm 36 is of slightly smaller diameter than the outer arm 37 and is spaced axially farther forward relative to the respectively secured and concentrically journalled drive shafts 42 and 44. The rearwardly spaced outer arm 37 has a hole in it that is larger than the forwardly extending hub 42A of a slightly larger diameter tubular shaft 42 journalled to rotate in a sleeve bearing 43 that is carried in the forward outer wall of the stationary housing 32. Toward its rearward end, the tubular control gear shaft 42 is provided with an independent control gear 47, presently illustrated in axially rearward position as being locked against rotation by engaging a stationary rack 56. The tubular shaft 42 is likewise journalled to rotate about a concentrically journalled rearwardly extending primary shaft 44 of slightly smaller diameter, that is provided with a splined outer end 44A engaging the forwardly spaced arm 36. Primary shaft 44 is integrally formed with a rearwardly extending end 44E of smaller stepped diameter to rotate in a sleeve bearing 48 carried in a spaced apart stationary rearward wall 32A of the housing 32.

The spaced apart rearward wall 32A is fixedly secured by parallel spaced apart side walls 46 and 46A to the front wall 32 to constitute a rigid rectangular frame structure or housing for the tool change mechanism 34. The axially spaced apart sleeve bearings 43 and 48 respectively support the outer concentric tubular shaft 42 and inner primary shaft 44 for rotatable movement as well as concentric, axially forward shifting movement to move both of the arms 36 and 37 in a corresponding forward direction and also to shift both input gears to axially forward positions indicated at 47S and 53S for simultaneously engaging the forward rack 54.

In put power for driving the smaller diameter primary shaft 44 is provided by an input spur gear 50 fixedly secured to the rearward end thereof in concentric relationship to the forwardly spaced spur gear 47 secured to the concentric outer tubular drive sleeve 42.

As presently viewed in FIG. 4, the axially rearward input gear 50 is engaged by the lineally movable rack 53 for rotatably driving the tool change arms 36 and 37 from vertical parked position into enclosed clamped engagement with a pair of horizontally spaced apart tools. During 90° reverse movement in either direction, gear 50 is rotatably driven by transversely and lineally movable rack 53. During this time, the concentrically disposed drive gear 47 secured to the outer tubular sleeve 42 is locked against rotation by engagement with the axially extending stationary transfer rack 56 that is fixedly bolted to an axially extending support web 57 secured between the stationary front and rear walls 32 and 32A of the housing. During 90° reverse rotation in either direction, the outer tubular sleeve 42 is thus fixedly constrained against rotation as lineal input driving power is supplied to rotate the spur gear 50 by the rack 53.

During reverse rotation of the arms in either direction, therefore, the forwardly splined tubular collar 42A of the outer shaft 42 locks a planetary support ring 59 carried thereby against rotation to supply the reactive force to the associated bevel pinions. A pair of radially extending hubs 60 and 61 fixedly journalled in the support ring 59 rotatably support a pair of transversely journalled bevel pinions 62 and 63 interconnecting the tool change arms 36 and 37 for reverse rotation. As shown in FIG. 4, a large diameter, vertically journalled bevel gear 66 is fixedly secured to the inner hub of the primary or axially forward inner arm 36. In like manner, a spaced apart oppositely journalled bevel gear 67 of like diameter is affixed to the inner hub of the rearwardly spaced large diameter arm 37. This entire assembly is axially secured to the inner shaft 44 by means of an outer hub 69 positively threaded to an extreme outer end hub of the inner shaft 44. After the hub 69 is positively secured to the threaded outer end of the inner shaft 44 by a set screw 70, it is emphasized that the concentrically positioned tool change arms are positioned adjacently for rotation in the same or reverse directions. Further, the primary enlarged bevel gear 66, transverse interconnecting bevel pinions 62, 63 and the enlarged inner bevel gear 67 affixed to arm 37 are properly adjusted to transmit reverse driving power therebetween.

To simplify the subsequent description, the described bevel gears comprise a reverse planetary differential gear mechanism that is generally identified by the reference numeral 74, as operative to provide reverse driving power to rotate the arms 36 and 37 in opposite directions. The direction of reverse rotation between the arms depends upon the direction of rotation of the primary input bevel gear 66 which changes in accordance with the direction of rotation of inner primary shaft 44 and primary input gear 50 secured thereto.

The inner races of the bearings 78 and 79 separated by a spacer sleeve 80 are mounted directly on an outwardly extended tubular shoulder 77 integrally formed with arm 37, the outer races of these bearings are carrying an enlarged circular mounting sleeve 84. As shown in FIG. 4, the mounting sleeve 84 is provided with an integrally formed shoulder engaged by the outer race of bearing 78. In addition, the forward outer periphery of mounting sleeve 84 engages a circular shoulder presented by the forward arm 36 which is directly secured thereto by means of cap screws 85. Thus, the spaced apart bearings 78 and 79 provide an antifriction support to facilitate 90° relative rotation of the arms 36 and 37 when the entire assembly is axially shifted to extreme inward position as shown in FIGS. 3 and 4. Further, the bearings 78 and 79 provide a fixed, nonrotatable mounting shoulder to rigidly support the arms 36 and 37 together with the tools carried thereby as this assembly is shifted axially forward whenever both drive gears are likewise shifted forwardly to the positions indicated at 50S and 47S.

To supply power for driving the 90° lineally movable vertical rack 53 and the parallel 180° rack 54 in either direction, a pair of axially spaced vertical hydraulic cylinders 88 and 89 are fixedly secured to the lower housing wall 46. A piston rod 91 connected to be driven by a piston within cylinder 88 is operatively connected to move the lineal rack 53 along the transversely extending vertical support guideway 94 that is mounted within the stationary frame 32. In like manner, an axially spaced, stationary vertical guideway 95 slidably supports the lineally movable vertical rack 54 in response to input power supplied by piston rod 92 connected to be driven by the hydraulic cylinder mechanism 89. To predeterminately limit the extent of transverse movement of the lineal racks 53 and 54, adjusting plugs 96 and 97 are fitted in the transversely spaced apart walls 46 and 46A of the support frame.

The gear teeth presented by the parallelly movable racks 53 and 54 are disposed to be in synchronized alignment whenever either of the racks is moved to its extent of movement in either direction as established by movement into abutting engagement with the positive stops 96 and 97.

At the start of a tool change, pressure fluid admitted to a conduit 104 operates the cylinder mechanism 88 to move the piston and rack 53 lineally upward until the upper end of the rack abuts adjusting plug 97. Such lineal movement of the rack 53 from its present position engaging the lower abutment 96 rotates gear 50 a sufficient distance to rotate the forward, inner arm 36 in a 90° clockwise direction from vertical parked position (FIGS. 1 and 5), thus moving associated semicircular openings 36D and 36U into enclosed clamped engagement with spaced apart toolholders as indicated in FIG. 6. Simultaneously, since gear 47 is locked against rotation to supply reactive force to the planetary differential mechanism 74, the clockwise rotation of arm 36 effects a corresponding 90° reverse rotation of the outer arm 37 in a counterclockwise direction. Reverse rotation of the rearward outer arm 37 effects rotation of the semicircular openings 37U and 37D presented thereby into opposed clamped engagement with the spaced apart toolholders. As viewed in FIG. 3, the respective tool change arms 36 and 37 are illustrated after being displaced slightly from vertical parked position. As there shown, coordinate reverse movement of the arms 36 and 37 in their respective clockwise and counterclockwise directions, as viewed from the front of the machine, has already been initiated with such reverse movement being continued until the arms are rotated into horizontal opposed engagement.

After the arms have been rotated into fully enclosed clamped engagement with the respective tools, as shown in FIG. 6, it is necessary that the rack 53 be pressure maintained in its lineally upward position abutting the inner end of the adjusting plug 97. With lineal movement of the rack 53 maintained in this manner, the gear 50 is moved into synchronized alignment with the reactively positioned gear 47 locked against rotation by the axially extending transfer rack 56. With this 90° movement of the opposed arms 37 and 36 into horizontal clamped positions as described, a rearwardly extending cylinder 106 is operable to move the now clamped arms 36 and 37 axially forward to extract both of the now clamped tools. To do this, the cylinder 106 is fixedly secured to a rearward side wall 32A of the housing 32. As shown in FIG. 2, an axially movable piston rod 107 operatively driven by hydraulic cylinder 106 is secured to an axially movable drive plate 108 by means of a mounting screw 110. The axially movable mounting plate 108 is disposed in a laterally offset position relative to the transversely movable lineal rack 53. An antifriction bearing 111 mounted within an enlarged bore opening presented by the vertical guide plate 108 is provided with an inner race fixedly mounted between circular guide plates 114 and 115 affixed to the reduced diameter rearward end 44E of the inner axially movable drive shaft 44.

After lineal rack 53 is urged upwardly into abutting engagement with positioning plug 97 to lock both of the oppositely rotatable arms 36 and 37 in horizontal clamped engagement with the tools, fluid admitted to a rear conduit 117 urges the cylinder 106 to provide axial forward power. As this occurs, the forwardly urged piston rod 107 moves the transverse guide plate 108 forwardly to effect a like axial forward movement of the now rotatably clamped shafts 44 and 42 respectively. As axially forward movement is effected by pressure fluid to rearward conduit 117, the previously aligned drive gear 50 is moved forwardly into engagement with rack teeth presented by the axially extending transfer rack 56. It will be apparent that after traversing the full length of transfer rack 56, both gears 47 and 50 are moved axially into synchronized meshing engagement with the cooperatively engaged teeth of tool change rack 54 to positively retain the opposed semicircular openings presented by the arms 36 and 37 in enclosed clamped engagement around the respective toolholders.

Axial forward movement of intermeshing clamped gears continues until both gears are moved to the forward axial limit of movement, as indicated by the dotted line positions 47S and 50S in FIG. 4. Axial forward movement of gears 47S and 50S continues until the drive piston (not shown) within cylinder 106 reaches the predetermined axial limit of its movement. The described forward axial movement of the still clamped tool change mechanism 34 effects axial extracting movement of the already clamped toolholders from the respective tool spindle and storage magazine spindle as indicated at 26A and 27A in FIG. 7.

Selective electrical control of the tool change mechanism 34 to the limit of its axial movement in either direction is provided by a pair of axially spaced apart limit switches 118 and 119 respectively secured to a rearwardly extending mounting plate 120 affixed to the transverse rearward wall 32A of housing 32. Actually, the limit switches 118 and 119 comprise a pair of sequence control logic switches respectively actuated by a circular control cam 123 secured to the rearward end of the reduced diameter primary control shaft 44E. As shown in FIG. 2, it will be apparent that the described axial forward movement of the entire horizontally clamped tool change mechanism 34 in response to control fluid admitted to conduit 117 effects corresponding forward axial movement of shaft portion 44E and cam 123 into actuating engagement with the forwardly spaced control switch 118. Having reached the predetermined forward limit of axial movement, both of the still locked drive gears 47 and 50 are moved into full meshing engagement with the transversely movable rack 54. As this occurs, forward axial movement is stopped upon piston-cylinder mechanism 106 reaching the forward extent of its movement. Likewise, corresponding axial forward movement of the control cam 123 actuates limit switch 118 which is disposed to sequentially energize the control circuit for supplying pressure fluid to an inlet 124 at the lower end of the 180° hydraulic control cylinder 89.

It will be apparent that with both control gears maintained in meshing locked engagement with the vertically moving 180° control rack 54, the tool change mechanism 34 is also maintained in clamped engagement with the toolholders as the latter are rotated the required 180° to interchange the position of the axially withdrawn toolholders relative to the respective interchange stations. The described rotatably interchanged position between stations 26A and 27A will be described in somewhat greater detail in connection with the fragmentary detailed views shown in FIGS. 7 and 8 respectively.

A complete cycle of operation of the tool changer 34 in effecting a tool change between the horizontally spaced apart stations 26A and 27A is illustrated in FIGS. 5 to 10 inclusive. Prior to operating the tool changer 34, it is assumed the tool operating spindle 26 and the tool storage spindle 27 have been moved into the proper horizontally and vertically spaced apart interchange stations. This involves the necessary and coordinated vertical and horizontal movement of the tool spindle 26, as well as indexable and forward tilting movement of the storage spindle 27 into the respective tool interchange stations identified at 26A and 27A. With these conditions established, a milling cutter 26C and drill 27D are positioned for an interchange movement. In other words, a milling cutter 26C is positioned to be returned to the storage spindle 27 in exchange for the drill 27D being bodily transferred to the tool spindle 26.

With the coordinately rotatable clamp elements 36 and 37 of the tool changer 34 in retracted and parked position, the proper control signal is supplied to energize a control solenoid connecting the cylinder 88 to move the rack 53 to the limit of its lineally extending movement into abutting engagement with adjusting plug 97. With gear 47 simultaneously locked against rotation and gear 50 rotatably driven in a clockwise direction, the tool change arms 36 and 37 are reversibly rotated a distance of 90° in opposite direction from the vertical parked position shown in FIG. 5. Upon completion of the initial 90° movement, the respective arms 36 and 37 move into horizontally opposed clamped engagement to fully enclose the horizontally spaced apart preselected tools including milling cutter 26C and drill 27D as shown in FIG. 6. After this condition is achieved, the lineal rack 53 is retained in pressure actuated abutting engagement with the adjusting plug 97; simultaneously, a limit switch (not shown) is actuated and connected to energize a solenoid for activating the hydraulic circuit supplying fluid to the rear inlet 117 of cylinder 106. Although not shown, it will be understood that in all cases, pressure controlled diverting circuits are available to supply sufficient fluid pressure to maintain an originally established condition.

As soon as both arms 36 and 37 are fully clamped, as shown in FIG. 6, a tool spindle collet (not shown) is unclamped permitting admission of hydraulic pressure fluid to rear inlet 117 to urge piston rod 107 to the limit of axial forward movement effecting like axially extended movement of the now clamped changer 34 to fully extract the tools 26D and 37C carried thereby, as shown in FIG. 7. During such axially forward movement, angularly clamped gears 50 and 47 slidably engage the axially extending teeth of stationary transfer rack 56 to retain the pivotal arms 36 and 37 of tool changer 34 in initially clamped engagement with the selected tools 26C and 27D respectively. With the tools now fully extracted from the respective operating spindle 26 and storage spindle 27, cam 123 likewise moves axially forward to actuate limit switch 118 to automatically initiate the next sequential step in a tool change cycle. It will be recalled angularly clamped gears 47 and 50 have axially traversed the full length of transfer rack 56 to move into continued locked engagement with the 180° rack 54.

Actuation of forward limit switch 118 is connected to energize a solenoid disposed to connect a hydraulic circuit for supplying pressure fluid to rear inlet 124 of cylinder 89 for operating piston rod 92 to urge rack 54 to the limit of vertical lineal movement into abutting engagement with adjusting plug 97. The described lineal movement of rack 54 from the position shown is connected to rotate both of the clamped gears from axially forward shifted positions shown at 50S and 47S to simultaneously rotate both clamped arms 36 and 37 180° in a clockwise direction. As hereinbefore explained, the 180° rack 54 is then retained in pressure actuated abutting engagement with adjusting plug 96.

Upon arrival of the tools in the 180° interchanged position shown in FIG. 8, lineal advancement of the rack 54 to the forward extent of its movement operates to actuate a limit switch operatively disposed to energize a solenoid controlling a hydraulic circuit for supplying pressure fluid to a forward conduit 121. Thereupon, cylinder 106 is reactivated for returning piston rod 107 to the limit of its axially inward retracting movement for reinserting the interchanged tools 27D and 26C into the respective horizontally spaced apart spindles 26 and 27 as shown in FIG. 9.

As the 180° interchanged tools are fully inserted into the spaced apart spindle sockets, corresponding axially rearward movement of cam 123 carried by rod 44E again actuates limit switch 119 for initiating the next step in the cycle. At this time, it will be recalled that gears 47 and 50 have been axially returned from the axially forward, phamtom line positions to the solid line positions shown and described in FIG. 2. With the latter condition re-established, therefore, gear 47 is again retained in locked engagement with stationary rack 56 as gear 50 is returned into re-engagement with rack 53 which has been retained in pressure actuated lineally abutting positioned engagement with adjusting plug 97. Thus, the reactive force for planetary support ring 59 is again established by the relocked primary shaft 44, as the gear 50 is axially remeshed with the rack 53 now positioned to initiate 90° reverse rotation of the arms 36 and 37 from horizontal clamped position to vertically parked position.

Movement of the tools 27D and 26C to fully reinserted interchanged position, FIG. 8, has effected rearward movement of cam 123 to actuate switch 119 for initiating the next two steps in the cycle. First, reactuation of switch 119 is operatively connected to reactuate the spindle collet (not shown) for positively clamping the now interchanged drill 27D in the operating tool spindle 26. In addition, switch 119 is connected to energize a solenoid connected to energize a hydraulic circuit now operatively disposed to supply pressure fluid to a conduit 105 connected to operate cylinder 88 in a reverse direction. In other words, with pressure fluid now being supplied to conduit 105 and disconnected from conduit 104, piston rod 88 is moved in reverse inward direction to return the rack 53 from the established position abutting plug 97 into pressure maintained abutting engagement with the plug 96.

Briefly, reverse lineal movement of rack 53 rotates primary gear 50 a sufficient distance to reversibly return both arms 36 and 37 from horizontally enclosed, clamped positions about interchanged tools 27D and 26C, FIG. 9, to vertically parked position as shown in FIG. 10. Such 90° reverse rotation of primary gear 50 effects like reverse rotation of primary shaft 44, arm 36, and the bevel gear 66 secured to the arm 36. This effects return counterclockwise rotation of the forward inner arm 36 from horizontal position, FIG. 9, into vertical parked position, FIG. 10. Simultaneously, since a reactive force is again being supplied by locked planetary support ring 59, the interconnected bevel pinions 60 and 61 rotate enlarged bevel gear 67 and the rearwardly spaced larger diameter outer arm 90° in the opposite or clockwise direction. Therefore, the return 90° counterclockwise rotation of the inner arm 36 is operatively connected to effect 90° clockwise rotation of the outer arm 37 in a reverse direction. Consequently, both arms 36 and 37 are coordinately moved from horizontal clamped position engaging the tools into the substantially vertical parked positions shown in FIG. 10.

Rack 54 is retracted at the same time rack 53 is retracted, causing movement of both racks back to original parked position. The stroke of rack 54 is longer than rack 53, and is effected by directing pressure fluid into a conduit 125 connected to operate cylinder 89 for returning the piston therein into abutting engagement with plug 96. Although rack 54 reaches parked position first, both start a next cycle from the original parked positions shown.

Figure 11:
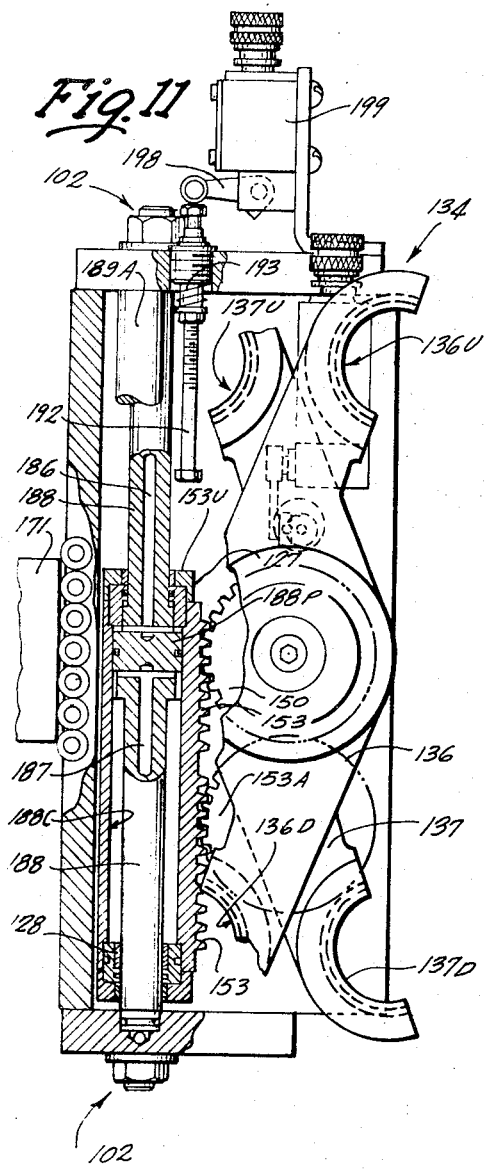
FIG. 11 is a view partly in front elevation and partly in section of an improved modified embodiment of the invention.
Figure 12:
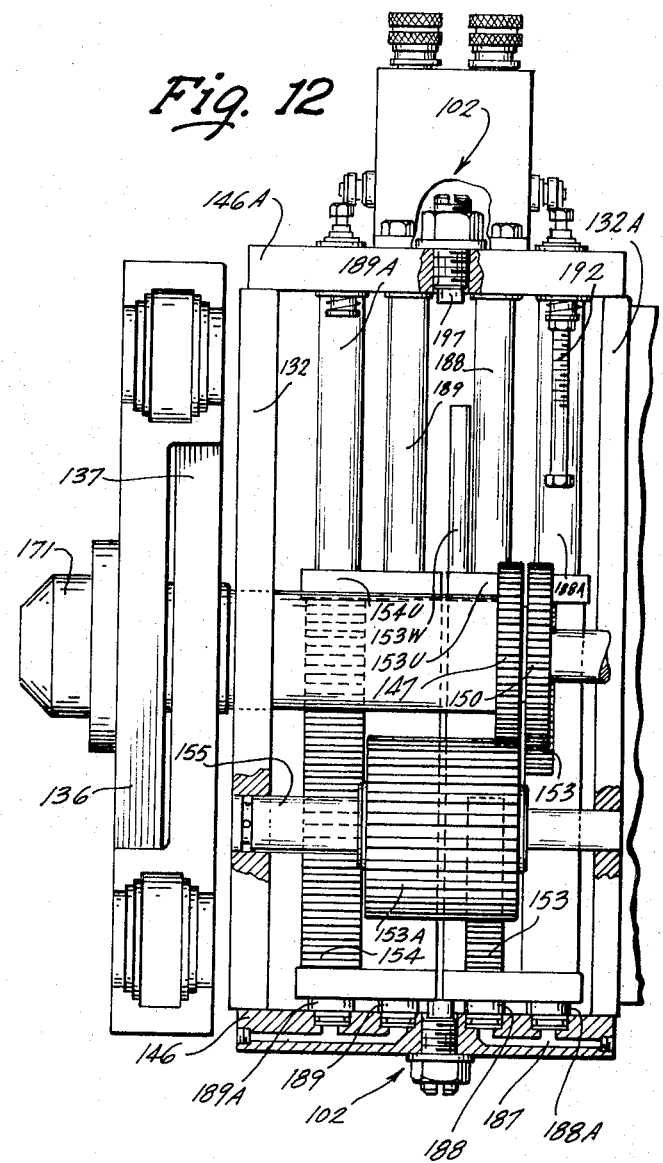
FIG. 12 is a view in right side elevation, partly in section, of the improved embodiment shown in FIG. 11.
Figure 16:
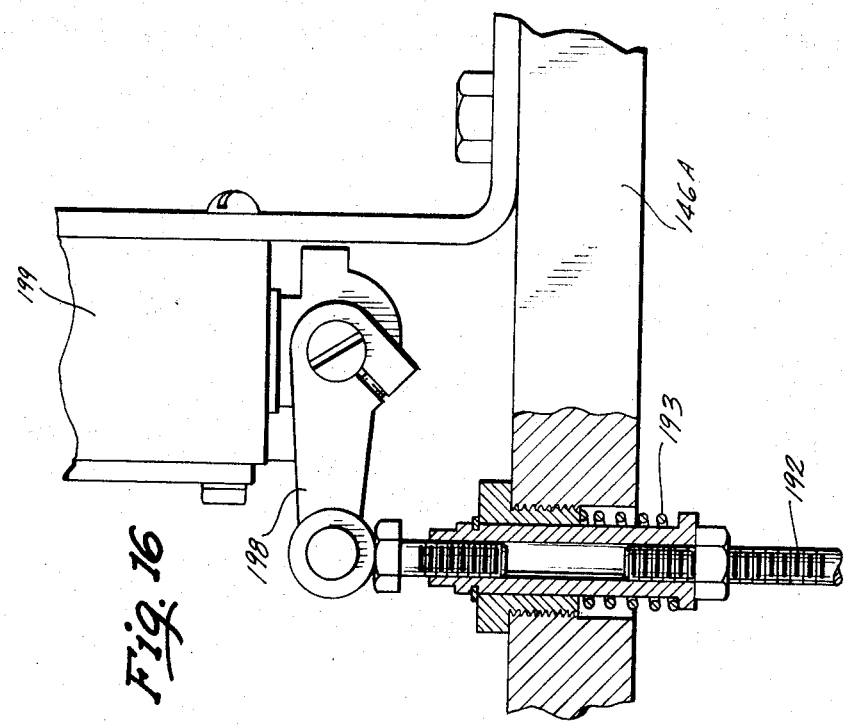

A further improvement and modified embodiment of the applicant's invention is illustrated in FIGS. 11 to 16 inclusive. To facilitate an understanding and correlation of the inventive embodiment there shown, with the principal embodiment depicted in FIGS. 1 to 10 inclusive, similar or corresponding reference numerals are provided to identify corresponding elements. For example, the principal tool change arm shown in FIGS. 1, 2 and 3 is identified as 34, the corresponding tool change arm in FIGS. 11 and 12 is identified as 134. In similar manner, the pivotally coordinated clamping arm members identified as 136 and 137 in FIGS. 11 and 12 correspond to the arm members 36 and 37 in FIGS. 1, 2 and 3 with one principal exception. The exception is the fact that arms 36 and 37 are normally in-vertical overlapping parked position as shown in FIG. 1. In FIG. 3, the arm members 36 and 37 are simply illustrated as being partially displaced from exact vertical parked position on the way to a 90° movement to coordinated enclosed engagement with a pair of tools to be interchanged. In contrast, the corresponding arm members 136 and 137 in the modified embodiment shown in FIG. 11 are permanently parked in a position 20° offset from the original vertical parked position described in connection with the principal embodiment. This simply means that the complete cycle time for a tool interchange is even further reduced since the arm members 136 and 137 require only a 70° movement from the 20° offset parked position shown in FIG. 11 to the horizontally spaced apart tool change stations hereinbefore described. In all other respects, the sequentially controlled movements for actuating the tool change arm 134 in effecting a tool change cycle are substantially similar to the tool change cycle hereinbefore described and illustrated in connection with FIGS. 5 to 10 inclusive. The actuating mechanism for the tool changer 134 shown in FIGS. 11, 12 and 14 provides several other marked improvements over the embodiment illustrated in FIGS. 1 to 10. For example, the entire control transmission is completely enclosed within a substantially rectangular housing 132 having the additional parallel spaced apart side walls 132A, 146 and 146A. The rectangular housing 132 is supported for pivotal movement about a vertical axis 102 and is provided with a minimum of externally mounted control elements. To compare the general orientation of the mechanism comprising the reverse drive and tool change drive shown in FIG. 12, attention is first directed to the parallel spaced apart racks 153 and 154 mounted for lineal movement in housing 132.

In view of the 20° offset parked position of clamp elements 136 and 137, a first or 70° rack 153 is mounted for selective reciprocal movement between the stationary end walls 146 and 146A of the tool change housing 132. The reciprocal rack 153 is connected to effect coordinate reversing movement of the arms 136 and 137 a distance of 70° at the start and completion of each tool change cycle, and performs an input control analogous to the reverse input control provided by rack 53 in FIG. 2.

To effect simultaneous 180° rotation of both arms after they have been clamped, the shiftably engaged or clamped gears 147 and 150 are moved axially from the positions shown in FIG. 12 into meshing engagement with an axially spaced apart rack 154 that is mounted for reversible reciprocal movement between end walls 146 and 146A. Thus, rack 154 is lineally movable to provide a 180° tool change control movement analogous to the one imparted by applicant's rack 54 in FIG. 2.

The 70° rotation of the tool change arms 136 and 137 in opposite directions is achieved by the drive mechanism that is best illustrated in FIG. 12. The rack 153 is formed of two laterally spaced rack sections 153 with one section of the rack 153 being in meshing engagement with the gear 150 and the other section of the rack 153 being in meshing engagement with an idler gear 153A which, in turn, is in meshing engagement with the gear 147. Although the two sections of the rack 153 move in unison, the gear 147 is driven by the rack 153 through the idler gear 153A and therefore rotates in a direction opposite to the direction of rotation of the gear 150 which is in direct engagement with the rack 153. Accordingly, since the gear 150 is coupled to the arm 136 and the gear 147 is coupled to the arm 137, the two arms 136 and 137 are rotated in corresponding opposite directions in unison with the rotation of the gears 150 and 147 as caused by the rectilinear movement of the two rack sections 153. For guiding the integrally formed spaced apart rack sections 153, lower and upper guide plates such as 153U are provided at its opposite ends. The upper guide plate 153U, as shown in FIG. 12, as well as the lower guide plate, slidably engage a pair of stationary spaced apart parallel guide rods identified as 188 and 188A which are fixedly supported at their opposite ends within the spaced apart housing walls 146 and 146A.

In similar manner, the spaced apart lineally reciprocal rack 154 is provided at its opposite ends with stationary guide walls 154U. As likewise shown in FIG. 12, a pair of stationary, spaced apart parallel guide rods 189 and 189A are secured at their opposite ends within housing walls 146 and 146A to engage guide plates, such as 154U at the opposite ends of rack 154, to slidably support the rack for reciprocal movement.

It is particularly emphasized that the cooperatively disposed hydraulic elements are further consolidated within the housing 132 by means of an extremely novel arrangement of fluid transmitting manifolds, cooperatively disposed pistons and guide rods, and an improved modified reversing control of arms 136 and 137.

For moving into enclosed clamped engagement with spaced apart tools in the tool change stations, the pivotal arms 136 and 137 are provided at their opposite ends with semicircular tool engaging openings. As shown in FIG. 11, the rearward or outer pivotal arm 137 is provided with semicircular openings 137U and 137D. In similar manner, the forward or inner pivotal arm 136 is provided with upper and lower semicircular openings 136U and 136D. Pivotal movement of the arms 136 and 137 a distance of 70° in opposite directions from the illustrated parked positions moves the semicircular openings presented by each arm into tool enclosing clamped positions. In other words, pivotal movement of the arms into horizontal position effects movement of upper semicircular opening 136U into cooperating tool enclosing clamped position with respect to semicircular opening 137D. Simultaneously, upper opening 137U is moved into tool enclosing clamped position relative to lower opening 136D. In a similar manner as hereinbefore described, at the completion of a tool change cycle, the respective arms 136 and 137 are pivotally returned a distance of 70° from horizontal tool enclosing clamped positions to the 20° offset, substantially vertical parked positions illustrated in FIG. 11.

The reciprocal rack 153 is also provided with spaced apart bored openings in the respective upper and lower guide plates that carry sleeve bearings disposed to slidably engage the stationary circular support rods 188 and 188A. In addition to functioning as one of two parallel stationary guide rods 188 and 188A, the guide rod 188 also functions as a stationary piston rod and is integrally formed with a centrally located stationary piston 188P as shown in FIG. 11. To provide power for the required reciprocal movement, the rack portions 153 are integrally formed with an internal cylinder 188C mounted for reciprocal movement along the periphery of the centrally disposed stationary piston 188P. For transmitting pressure fluid to the required points to initiate either upward or downward reciprocal movement of the rack 153 within the tool change support housing 132, there are provided integrally formed fluid transmitting manifolds. These manifolds include axially extending ports 186 and 187 respectively formed in the upper and lower ends of the stationary guide and piston rod 188, that connect with cooperating fluid transmitting ports in the respective lower and upper support housing plates 146 and 146A.

For example, actuating the control circuit to supply pressure fluid to the axial port 186 within the upper portion of stationary piston rod 188, FIG. 11, supplies pressure fluid above the stationary piston 188P immediately effecting lineal upward movement of the slidable cylinder 188C to effect corresponding movement of the integrally formed rack portions 153 to the vertically upward extent of movement. Lineal upward movement of rack 153 is stopped upon movement of the upper end of a vertical stop rod 153W secured to end plate 153U into abutting engagement with a downwardly extending adjustable stop 197. Operation of this positive stop is coordinated with operation of a resiliently movable limit switch stop arm 198 by a downwardly extending, vertically movable switch actuating stop rod 192. The downwardly extending vertically movable stop rod 192 is normally biased downwardly a slight distance by spring 193. A vertically upward or shuttle type lineal actuating movement of rack 153 forces the stop 192 axially upward to actuate a pivotal switch arm 198 for initiating the next cycle of operation. As hereinbefore explained, actuation of switch arm 198 functions concomitantly to maintain the rack member 153 in its continued, pressure actuated positively urged vertically upward position to maintain the semicircular outer ends of the respective arms 136 and 137 in continued, pivotally engaged tool enclosed clamp positions during a subsequent tool change operation.

Although not shown, a switch similar in function and mode of operation to the switch 193 is provided at the opposite lower end of tool change housing 132. The other switch functions in a similar manner and is actuated by the lowermost face of the vertically reciprocal rack 153 upon its return movement to the position now illustrated in FIG. 11.

Before explaining the mode of operation of the applicant's further improved embodiment shown in FIGS. 11, 12 and 14, it is necessary to explain the configuration of the novel internally ported manifold piston rod 144R depicted in FIG. 14. The vertical piston rod 144R is rotatably journalled at its rearward end in a bearing 160 in an end plate 132A of support housing 132. To permit operation as a rotatable support for arm 136 in one direction, for both arms 136 and 137 in the same direction, as well as functioning as a piston and manifold, the rod is mounted to rotate in rotary seals 161. To begin with, it will be clear that the axially forward drive gear 147 is secured to an axially extending outer, tubular drive sleeve 142 splined at its forward end to the rearward or larger tool change arm member 137. In effect, these parts including spaced apart forward drive gear 147, axially extending outer tubular drive sleeve 142 and the rearward large diameter arm 137 are secured together to permit selective reverse rotation of the arm 137 relative to the arm 136 or to permit simultaneous coordinated rotation of these arms in the same direction. In a similar manner, the axially rearward drive gear 150 is connected to rotate a concentrically journalled axially extending intermediate tubular sleeve 144 that is splined at its extreme forward end to the axially forward or smaller tool change arm 136. In a manner similar to that hereinbefore explained in FIG. 4, an adjusting hub 140 is positively splined to the extreme outer end of the intermediately journalled tubular drive sleeve 144 adapted to impart selective rotation to the forward arm 136. With the hub 140 positively threaded and locked to the extreme outer end of tubular drive sleeve 144 by a set screw 170, another adjusting set screw 171 is provided to effect the necessary axial adjustment for the inwardly stopped position of the concentrically mounted arms 136 and 137. It will be apparent that the concentrically journalled tubular sleeves 142 and 144 are respectively analogous in function to the outer tubular sleeve 42 and concentrically journalled solid shaft 44 of stepped diameter shown in FIG. 2.

To effect the required axially extensible forwardly shifted movement of the arms 136 and 137 after these arms have been rotated 70° into enclosed clamped engagement with the tools, the elongated axially stationary, but rotatably mounted piston rod 144R is illustrated in FIG. 14 as extending in axially elongated stationary concentric position within the axially concentric and independently rotatable tubular drive sleeve 144 connected between the arm 136 and drive gear 147. The elongated axially stationary and rotatably mounted piston rod 144R provides a centrally located axially stationary piston 144P having a stationary piston ring 144S within the inner tubular drive sleeve 144 that is mounted thereon for both relatively axial and relatively rotatable movement. In addition, there is provided an axially extending rotatable tubular cylinder 206 integrally formed in the tubular drive sleeve 144 and adapted to slidably engage the axially stationary piston rod 144R, as clearly illustrated in FIG. 14, for effecting controlled axial shifting movement therealong.

To shiftably move the angularly positioned arms 136 and 137 axially after they have been rotatably clamped by vertical shifted upward movement of 70° rack 153, actuation of limit switch arm 198, FIG. 11, by upward shifting movement of rack 153 energizes a solenoid connected to supply pressure fluid to the inlet 217, FIG. 14. From inlet 217, pressure fluid is transmitted via a horizontally drilled line 217D formed in stationary base member 132A to a circular grooved line 217R formed in the lower portion of the elongated rotatable piston rod 144R. The flow of pressure fluid continues along an axially extending drilled line 217V and thence out a transverse line to a chamber formed above the stationary piston 144P. With a lower supply line 221 connected to exhaust, pressure fluid from supply line 217 above the stationary piston 144P effects immediate axially forward movement of the angularly clamped gears 147 and 150 to the limit of axial movement of the respectively intermeshed tubular drive shafts 142 and 144.

Thus, the rotatably and angularly clamped gears 147 and 150 are shiftably advanced in an axial direction until both of these gears are intermeshed with the teeth presented by the transversely extending parallelly and axially spaced apart 180° vertical rack 154. During this axial shifting movement of clamped gears 147 and 150, the axially extending teeth of the now rotatably stationary, elongated reverse idler gear 15A, FIG. 12, function to meshingly engage the rotatably synchronized positioned teeth of angularly clamped gears 147 and 150 to maintain the gears and arms in continued clamped engagement.

Figure 15:
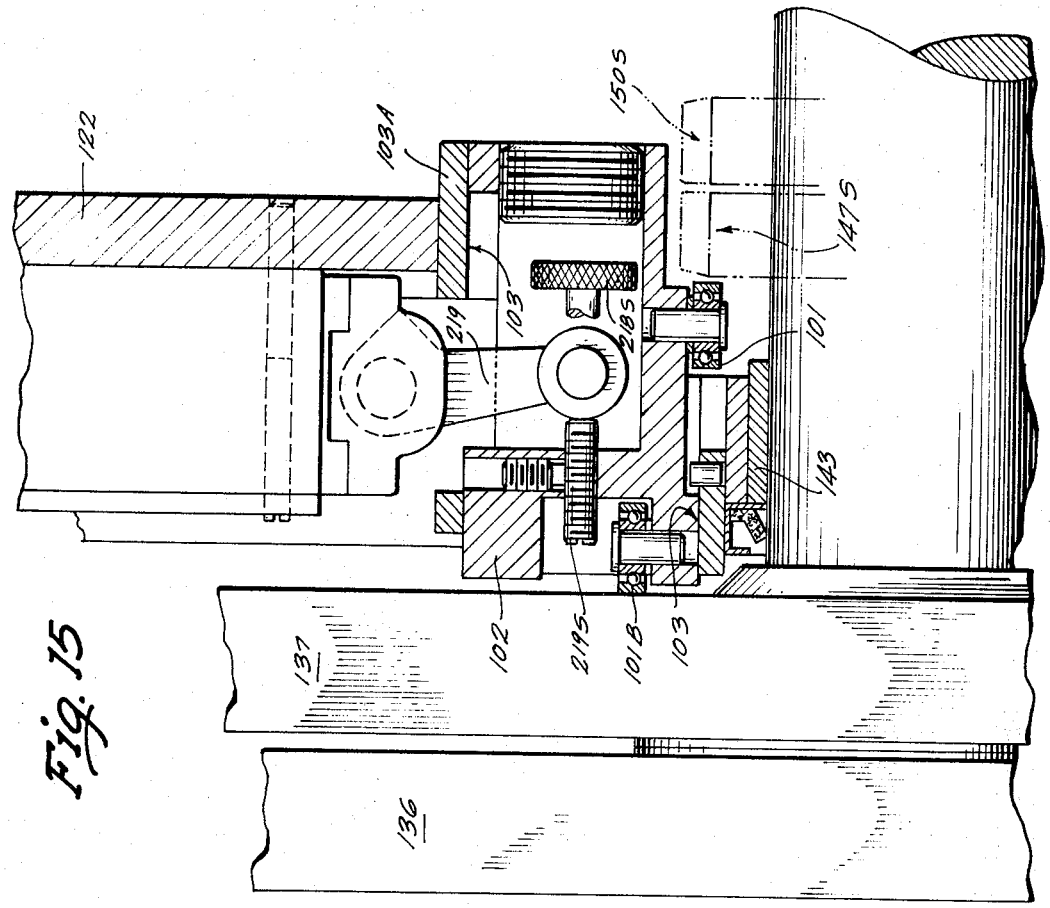

The positive stop for this axial shifting movement is provided by axial outward movement of a shoulder 144U into abutting engagement with a lower face of piston 144P. Axial extracting shiftable movement of the coordinately clamped arm elements 136 and 137 of tool changer 134 is indicated by shiftable movement of a side face of the axially forward gear 147 into peripheral engagement with an axially movable bearing 101, as shown in FIG. 15. The bearing 101 is rotatably carried by shaft mounted in a shuttle 102 that, in turn, is carried for limited axial slidable movement in ways 103 presented by the stationary frame structure 132. At its opposite edge, the axially movable shuttle stop 102 is provided with another rotatable stop bearing 101B. Upon axial inward retracting movement of the change arms 136 and 137 to reinsert the interchanged tools, an inner side face of the axially rearward change arm 137 is adapted to move into actuating engagement with the outer periphery of rotatable bearing 101B. As illustrated in FIG. 15, axial inserting movement of the rearward face of the inner arm 137 engages the rotatable bearing 101B to effect corresponding axially rearward movement of the shuttle 102 to actuate the pivotal arm of an associated limit switch 219. After the arms have been fully retracted as shown in FIG. 15, to reinsert interchanged tools, the switch arm 219 is then pivotally moved to initiate the next two functions required in the tool change cycle. In this case, since switch 219 is actuated to indicate completion of a tool interchange, one solenoid is energized to effect reclamping of the tool spindle collet (not shown); and, another solenoid is energized to effect a flow of pressure fluid to a lower drilled line 187, FIG. 12, thereby effecting reciprocal return of the lineal rack 153 from its pressure maintained upward position. Pressure actuated reciprocal return of the lineally movable rack 153 in turn is connected to rotate the arms 136 and 137 in reverse direction from the horizontal clamped position to the 20° offset parked position shown in FIG. 11. The shuttle 102 is provided with an axially preset screw 219S for axially pivoting the arm 219 of the associated switch.

Conversely, for indicating axially extensible extracting movement of tools, the shuttle 102 is provided with another presettable adjusting screw 218S connected to preset the shuttle movement to actuate a different pair of contacts within the same limit switch (219). As well known in the art, a pivotal switch arm is pivotal in one direction for an outward indication and in the opposite direction for an inward indication. The adjustable positive stop for this motion is the screw 171 abutting the piston rod 144R.

Upon axial shifting of the gears 147S and 150S to the phantom line positions indicated in FIG. 14 for engaging the 180° control rack 154, the forward face of gear 147 engages the peripheral edge of the rotary bearing 101 as explained to effect forward axial shifting movement of the shuttle 102. Such axial movement effects corresponding axial movement of the adjusting arm 218S to actuate the other pivotal switch arm 218 (not shown) and extending into the axially movable shuttle 102.

After the angularly clamped control gears 147 and 150 have been moved axially into shiftable meshing engagement with lineal rack 154, it will be readily apparent that axial outward movement of clamped arms 136 and 137 has fully extracted the associated clamped tools from the respective sockets. It will be equally apparent that lineal vertical upward movement of the 180° rack 154 rotates the axially engaged gears 147 and 150 to now rotate both angularly clamped tubular drive sleeves 142 and 144 in the same clockwise direction to rotate both clamped arms 180° to interchange the position of the tools for reinsertion. Although the 180° interchanging movement is analogous to that hereinbefore described in FIG. 2, the mode of operation in achieving that operation is analogous to that illustrated and described in the improved embodiment of FIGS. 11 to 16 inclusive. In other words, the rack 154 is formed integrally with a cylinder (not shown) slidably engaging a stationary piston fixedly carried by a stationary piston rod formed integrally with guide rod 189. In other words, the associated piston and cylinder, as well as the manifold control are identical to those fully described and illustrated in FIG. 11.

At the completion of a 180° indexable movement of the axially extracted clamped arms 136 and 137, the interchanged tools are reinserted into the spindles. To do this, a cycle control limit switch is actuated to energize a solenoid for actuating a hydraulic control circuit to connect the line 217 to exhaust and supply pressure fluid to an input line 221, FIG. 14. The latter is connected to supply pressure fluid to a drilled line 221 in the wall 132A that, in turn, is connected to supply pressure fluid to a grooved circular line 221R which transmits pressure fluid to a vertical line 221V formed in the elongated piston rod 144R. The vertical line 221V provides a flow of pressure fluid within the enlonged tubular cylinder 206 and below the stationary piston 144P. As a result, pressure fluid within tubular and axially movable cylinder 206 urges the entire assembly axially inward to effect correspondinginward inserting movement of the tools carried by rotatably clamped arms 136 and 137. Incidentally, the lower end of the cylinder 206 within the axially extending tubular drive sleeve 144 is delimited by a lower collar 210. As clearly shown in FIG. 14, the circular collar 210 is of stepped diameter provided with an enlarged circular shoulder secured by spaced cap screws 212 extending upwardly to retain the circular collar 210 to the axially lower drive gear 150. As already explained, circular stepped collar 210 is also provided with the circular shoulder 144U adapted to engage the lower periphery 144T of the stationary piston rod 144R for limiting axial movement.

From the foregoing detailed description of the illustrative embodiments set forth herein to exemplify the present invention, it will be apparent that there has been provided an improved tool securing clamping mechanism and bodily interchange mechanism for a machine tool.

It is particularly emphasized that the inventive concept is directed to independent transmission means respectively connected to first pivotally move a pair of coordinately rotatable clamp arms in opposte direcrtions into clamped engagement with a pair of tool elements to be interchanged; next, to axially move the clamped arms in the same direction to extract the tools from interchange stations as well as engage the still clamped arms with another axially spaced transmission connected to effect a bodily interchange movement in the same direction of the still clamped tools. In both of the described embodiments, spaced apart lineally movable racks have been respectively connected to effect different input power functions. The first lineally movable rack provides a source of driving power for effecting reverse movement of the arms from parked to enclosed tool engaging clamped positions at the start of a cycle and return movement of the clamped arms to parked position at the end of an interchange cycle. The spaced apart lineally movable rack is disposed to provide a source of input driving power for rotating the clamped tool change arms 180° for interchanging the positions of the selected tools.

In one embodiment, a planetary differential gear mechanism is disposed to provide a source of reverse driving power at the start and completion of a tool change cycle for respectively moving the pivotal arms into clamped position and for returning the arms from clamped to parked position. The second embodiment provides a reverse idler interconnected to rotate the independent arm elements in reverse direction for respectively clamping or unclamping the coordinately pivotal tool change arms. It is particularly emphasized that the described embodiments are not limited to spaced apart lineally movable racks as a source of input driving power. It will be apparent that other types of driving power can be substituted for the racks 53 and 54 shown in FIGS. 2 and 3, or the lineally movable racks 153 and 154 shown in FIGS. 11 and 12. For example, axially spaced apart gear drives or direct motor drives can be substituted as sources of input driving power to the respective independently rotatable arm elements.

Although the illustrative embodiments of the invention have been described in considerable detail for the purpose of disclosing a practical, operating structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the subjoined claims.

What I claim is:

1. In a tool change mechanism for interchanging tools between a tool storage magazine and an operating station;
    a frame;
    a pair of independently journalled cooperatively disposed tool change arms carried by said frame;
    a first drive gear means carried by said frame;
    driven gear means connected to be engaged by said first drive gear means and being operative to transmit power to rotate said tool change arms in opposite directions in response to power from said first gear means;
    first shifting means connected to actuate said first drive gear means to effect opposite rotation of said tool change arms in a tool change cycle;
    a second drive gear means carried by said frame;
    second shifting means connected to actuate said second drive gear means for transmitting power to rotate said tool change arms in the same direction in a tool change cycle; and,
    means operable to engage said driven gear means to receive driving power from said first or second drive gear means respectively.

2. In a tool change mechanism according to claim 1 wherein said first drive gear means are carried by said frame in axially spaced relationship to said second drive gear means;
    axially extending guide means carried by said frame to define an axial path transverse to said axially spaced first and second drive gear means carried by said frame; and
    power operable shifting means connected to effect selective axial shifting movement of said driven gear means along said axially extending guide means for so positioning said driven gear means as to receive driving power from said first drive gear means in a position to transmit driving power or for so positioning said driven gear means as to receive driving power from said axially spaced second drive gear means in a position to transmit driving power.

3. In a tool change mechanism according to claim 1 wherein said driven gear means for transmitting driving power to drive said tool change arms is selectively positionable relative to said first and second drive gear means for operating to transmit driving power for simultaneously rotating said tool change arms in opposite directions or for supplying unidirectional driving power for simultaneously rotating said tool change arms in the same direction.

4. In a tool change mechanism according to claim 1 wherein said driven gear means for transmitting driving power to drive said tool change arms is selectively positionable to transmit driving power.

5. In a tool change mechanism for interchanging tools between a tool storage magazine and the operating work station of a machine tool;
   a frame;
   a pair of tool change arms carried by said frame for coordinate rotation about a concentric axis;
   a first drive gear means mounted in said frame;
   driven gear means engageable with said first drive gear means and connected with said tool change arms so that movement of said first drive gear means is connected to effect coordinate rotation of said concentrically journalled tool change arms in opposite directions;
   a first shifting means connected to move said first drive gear means for effecting opposite rotation of said tool change arms in a tool changing cycle;
   a second drive gear means mounted in said frame;
   a second shifting means connected to move said second drive gear means for moving said driven gear means, said tool change arms being connected to be driven in the same direction when said driven gear means are engaged to be driven by said second drive gear means; and,
   means operable to move said driven gear means into selective driven engagement with either said first or second drive gear means selectively.

6. In a tool change mechanism according to claim 5 wherein said tool change arms are connected to be driven in opposite directions by engagement of said driven gear means with said first gear means for pivotally moving said tool change arms from disengaged parked position into clamped engagement with a tool to be interchanged.

7. In a tool change mechanism according to claim 5 wherein said tool change arms are first pivoted into clamped engagement with a tool to be interchanged by engagement of said driven gear means with said first drive gear means; and,
   wherein said pivotally clamped tool change arms are connected to be driven in the same direction by engagement of said driven gear means with said second drive gear means for effecting a selective bodily interchanging movement of a tool carried in clamped engagement by said pivotally clamped arms.

8. In a machine tool change mechanism according to claim 5 wherein spaced apart tool receiving sockets are provided in said tool storage magazine and said machine operating station and wherein said driven gear means includes a first and second gear respectively and individually connected to drive each one of said tool change arms;
   means associated with said driven gear means connected to transmit power from said first drive gear means for oppositely operating said first and second gear to effect rotation of said tool change arms into tool clamping engagement with a tool; and,
   third shiftable means connected to effect axial shifting movement of said clamped first and second gears including axial guide means adapted to meshingly engage said first and second gears to maintain said tool change arms in clamped engagement for retracting a clamped tool from its socket, said third shiftable means being operative to axially move said clamped gears from meshing engagement with said axial guide means into intermeshing clamped engagement with said second drive gear means for effecting an operative connection to rotate said first and second gears in the same direction for effecting rotation of said clamped tool change arms in the same direction for moving a retracted clamped tool in a selected lateral direction.

9. In a tool change mechanism according to claim 5 wherein axial drive shaft means are journalled in said frame for axial shifting movement and for rotation about an axis transverse to said first and second drive gear means carried by said frame in axially spaced apart positions, said drive shaft means comprising separate axially extending concentrically journalled tubular drive shafts that are respectively adapted to support one of said concentrically journalled tool change arms;
   a power receiving gear carried by each of said concentrically journalled axially extending tubular drive shafts comprising said driven gear means;
   a third shifting gear means connected to effect axial shifting movement of said axial drive shaft means and said change arms for effecting like axial shifting movement of said power receiving gears relative to said axially spaced first and second drive gear means carried by said frame,
   whereby said power receiving gears are selectively engageable to transmit driving power in opposite directions to rotate said respective tubular shaft in like opposite directions and whereby said power receiving gears are selectively engageable with said second drive gear means to transmit power for rotating said tool change arms in the same direction.

10. In a tool change mechanism according to claim 5 wherein a pair of separate first and second gears are each respectively and independently connected to respectively rotate one of said cooperatively disposed pair of tool change arms;
   drive means are provided in said driven gear means in position to engage said first and second gears for supplying power to rotate said tool change arms into tool clamping engagement; and,
   means for shiftably moving said first and second gears to an axially spaced position for meshingly engaging said second drive gear means including axially extending gear means engageable with said first and second gears during shiftable movement for maintaining said arms in tool clamped engagement.

11. In a tool change mechanism provided with a frame having a tool receiving socket;
   a pair of movable grips carried by said frame in open parked position relative to said tool receiving socket;
   a pair of gears operatively journalled in said frame and each connected to move one of said grips from parked position into coordinately forcible tool engaging clamped engagement with a tool in said receiving socket;

a first gear rack including means operatively connectable to drive said gears in opposite directions to effect movement of said grips into clamped engagement upon rectilinear movement of said first gear rack in one direction; and, a second gear rack in an axially parallel spaced position adapted to simultaneously engage both of said gears and being rectilinearly movable to rotate both gears in the same direction for bodily moving said grips to an axially spaced position.

12. In a tool change mechanism according to claim 11 including second gear drive means positioned to meshingly engage said gears upon axial positioning movement thereof by operation of said axially extending power operable drive means, said second gear drive means being actuatable to effect selective unidirectional rotation of said gears and said clamped grips to a selected spaced position.

13. In a tool changing mechanism for a machine having a frame provided with a pair of spaced tool receiving stations;

a pair of pivotal arms which are normally maintained in a pivotally open parked position to present opposed tool engaging ends;

first power drive means including separate gears respectively and individually connected to rotate said pivotal arms in opposite directions for moving said tool engaging opposite ends from a parked position into coordinate forcible clamped engagement with a tool carried in one of said receiving stations; and second power drive means including separate gear means disposed to meshingly engage said gears to maintain said associated arms in a clamped position with said tool during axial movement to a spaced position, and an axially spaced power operable means disposed to meshingly engage both of said gears to maintain said pivotal arms in continued clamped engagement and being operable to simultaneously rotate both of said gears in the same direction for bodily moving said pivotal arms to transfer the clamped tool between spaced tool receiving stations.

14. In a tool change mechanism according to claim 13 wherein said first power drive gear means selectively engage said separate gears to rotate them in opposite directions to effect rotation of said arms in corresponding directions; and, said second drive means include second power drive gear means positioned in an axially spaced relationship and operable to simultaneously engage both of said gears for maintaining them in continued clamped engagement and supplying driving power to simultaneously drive both of said gears in the same direction.

15. In a tool change mechanism having a frame including tool receiving means;

first axially movable tool holding means journalled in said frame and comprising a first rotatable gear mounted on an axially extending tubular drive shaft secured at its forward end to a clamp arm extending radially outward to present a tool grip;

second axially movable tool holding means journalled in said frame and comprising a second gear journalled rearwardly of said first gear and mounted on an inner drive shaft journalled within said first tubular drive shaft and secured at its forward end to a second clamp arm extending radially outward to present a tool grip, said first and second radial clamp arms respectively extending in different radial directions in a parked position;

first power operable means connectable to rotate said first and second gears in opposite clamping directions for rotating said first and second tool grips from parked position into clamped engagement with a tool carried in said tool receiving means;

second power operable means connected to effect axially forward movement of said clamped gears including axially extending gear means intermeshing with said clamped gears as axially outward movement of said clamped tool arms extracts the clamped tool from said frame receiving means; and, third power operable means axially spaced and connected to simultaneously rotate said clamped gears in the same direction for rotating said clamped arms to effect bodily tool changing movement of a clamped tool.

16. In a tool change mechanism according to claim 15 wherein said first and second power operable means includes a pair of axially spaced transversely extending parallel and stationary piston rods and said third power operable means comprises an axially extending stationary piston rod laterally offset relative to said axially spaced stationary piston rods;

each of said three power operable means comprise a separate hydraulic cylinder axially slidable along its associated piston rod relative to an associated stationary piston; and, power control of the respective pistons is provided by directing a flow of pressure fluid through a system of internal pressure directing ports and manifolds formed within the associated stationary piston rods.

* * * * *